US012556785B2

(12) United States Patent
Feng et al.

(10) Patent No.: US 12,556,785 B2
(45) Date of Patent: Feb. 17, 2026

(54) IMAGE ACQUISITION DEVICE, IMAGE ACQUISITION APPARATUS, IMAGE ACQUISITION METHOD AND MANUFACTURING METHOD

(71) Applicant: BOE Technology Group Co., Ltd., Beijing (CN)

(72) Inventors: Xuan Feng, Beijing (CN); Xue Dong, Beijing (CN); Lei Wang, Beijing (CN); Yapeng Li, Beijing (CN); Wenjuan Wang, Beijing (CN); Jing Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 316 days.

(21) Appl. No.: 18/260,271

(22) PCT Filed: Feb. 20, 2021

(86) PCT No.: PCT/CN2021/077015
§ 371 (c)(1),
(2) Date: Jul. 3, 2023

(87) PCT Pub. No.: WO2022/174409
PCT Pub. Date: Aug. 25, 2022

(65) Prior Publication Data
US 2024/0056657 A1    Feb. 15, 2024

(51) Int. Cl.
*H04N 23/45*    (2023.01)
*H04N 23/951*    (2023.01)
*H04N 23/958*    (2023.01)

(52) U.S. Cl.
CPC .......... *H04N 23/45* (2023.01); *H04N 23/951* (2023.01); *H04N 23/958* (2023.01)

(58) Field of Classification Search
CPC .... H04N 23/45; H04N 23/951; H04N 23/958; H04N 25/702; H04N 25/705
See application file for complete search history.

(56) References Cited

U.S. PATENT DOCUMENTS

| 6,326,601 B1 * | 12/2001 | Hula | ...................... H10F 39/024 |
| | | | 438/69 |
| 9,241,111 B1 | 1/2016 | Baldwin | |

(Continued)

FOREIGN PATENT DOCUMENTS

| CN | 103227897 A | 7/2013 |
| CN | 204130538 U | 1/2015 |

(Continued)

OTHER PUBLICATIONS

International Search Report and Written Opinion, mailed Nov. 11, 2021, from PCT/CN2021/077015, 12 pages.

(Continued)

*Primary Examiner* — Hung H Lam
(74) *Attorney, Agent, or Firm* — Workman Nydegger

(57) ABSTRACT

Provided by the present disclosure are an image acquisition device, an image acquisition apparatus, an image acquisition method and a manufacturing method. The image acquisition device includes: image sensing member groups each including a plurality of image sensing members, and each image sensing member includes a photosensitive assembly with photosensitive components, and a lens assembly covering a photosensitive side of the photosensitive assembly; and shielding portions corresponding to the photosensitive components in a one-to-one correspondence. Each image sensing member group corresponds to a photography depth, and the plurality of image sensing member groups correspond to a plurality of photography depths. For the plurality of image sensing member groups at least one of following is included: the arrangement modes of the image sensing members in the (Continued)

image sensing member groups are different, and camera intrinsic parameters of the image sensing members in the image sensing member groups are different.

20 Claims, 12 Drawing Sheets

(56) References Cited

U.S. PATENT DOCUMENTS

| | | | |
|---|---|---|---|
| 2005/0078377 A1* | 4/2005 | Li | B29D 11/00278 |
| | | | 359/619 |
| 2006/0164533 A1* | 7/2006 | Hsieh | H04N 25/532 |
| | | | 348/E5.037 |
| 2009/0027541 A1* | 1/2009 | Takayama | H10F 39/8023 |
| | | | 348/340 |
| 2009/0250733 A1* | 10/2009 | Adkisson | H10F 39/802 |
| | | | 257/292 |
| 2011/0080487 A1* | 4/2011 | Venkataraman | H04N 13/239 |
| | | | 348/E5.024 |
| 2013/0194471 A1 | 8/2013 | Yamashita | |
| 2015/0179695 A1 | 6/2015 | Lyu et al. | |
| 2015/0256744 A1 | 9/2015 | Mamboodiri et al. | |
| 2016/0133663 A1 | 5/2016 | Minowa et al. | |
| 2017/0280080 A1 | 9/2017 | Machida et al. | |
| 2018/0077322 A1 | 3/2018 | Melakari et al. | |
| 2020/0084361 A1 | 3/2020 | Xu et al. | |
| 2020/0195837 A1 | 6/2020 | Miu et al. | |
| 2020/0359002 A1* | 11/2020 | Yamazaki | H04N 25/70 |
| 2021/0203821 A1 | 7/2021 | Wang et al. | |

FOREIGN PATENT DOCUMENTS

| | | |
|---|---|---|
| CN | 104469147 A | 3/2015 |
| CN | 104733480 A | 6/2015 |
| CN | 105791646 A | 7/2016 |
| CN | 105934826 A | 9/2016 |
| CN | 109716750 A | 5/2019 |
| CN | 111310554 A | 6/2020 |
| CN | 111683211 A | 9/2020 |
| CN | 111698348 A | 9/2020 |
| JP | 2006203833 A | 8/2006 |
| WO | 2016041432 A1 | 3/2016 |

OTHER PUBLICATIONS

Chinese Office Action, mailed Oct. 30, 2023, from Chinese App. No. 202180000264.5, 34 pages.

Min et al., "Real-time integral imaging pickup system based on binocular stereo camera", Infrared and Laser Engineering, vol. 46 No. 11, Nov. 2017, 14 pages.

* cited by examiner

IMAGE ACQUISITION DEVICE, IMAGE ACQUISITION APPARATUS, IMAGE ACQUISITION METHOD AND MANUFACTURING METHOD

CROSS REFERENCE TO RELATED APPLICATIONS

This application is a national phase entry under 35 U.S.C. § 371 of International Application No. PCT/CN2021/077015, filed on Feb. 20, 2021, the entire content of which is incorporated herein by reference.

TECHNICAL FIELD

The present disclosure relates to the technical field of semiconductors, in particular to an image acquisition device, an image acquisition apparatus, an image acquisition method and a manufacturing method.

BACKGROUND

A CMOS image sensor (CIS) is the most widely used and most valuable sensor unit in modern society.

In the design and manufacturing technology of CIS chips, reducing a size of a photosensitive pixel is one of the main development directions. Especially for consumer electronics, for example, a mobile phone, a tablet personal computer and other products that are limited in thickness, according to a design principle of an optical lens, CIS chips with large areas cannot be used. On the premise that the area is finite, reducing the size of the pixel helps to improve the resolution ratio of a CIS, thereby improving the quality of an image obtained.

SUMMARY

The present disclosure provides an image acquisition device, including: a base substrate; a plurality of image sensing member groups, disposed on a side of the base substrate, where each image sensing member group includes a plurality of image sensing members; and each image sensing member includes a photosensitive assembly with a plurality of photosensitive components, and a lens assembly covering a photosensitive side of the photosensitive assembly; a plurality of shielding portions corresponding to the plurality of photosensitive components in a one-to-one correspondence, where the shielding portion is located between the photosensitive component and the lens assembly, and shield a part of an area of photosensitive surface of the photosensitive component; each image sensing member group corresponds to a photography depth, and the plurality of image sensing member groups correspond to a plurality of photography depths. For the plurality of image sensing member groups, at least one of following is comprised: arrangement modes of the image sensing members in the plurality of image sensing member groups are different; or camera intrinsic parameters of the image sensing members in the plurality of image sensing member groups are different.

In a possible implementation, the different image sensing member groups are located in different areas, and the areas where the different image sensing member groups are located do not overlap each other.

In a possible implementation, the camera intrinsic parameters of all the image sensing members are the same, and the arrangement modes of the image sensing members in the different image sensing member groups are different.

In a possible implementation, in the same image sensing member group, the image sensing members are distributed in an array, in a distribution row direction of the image sensing members, a center interval of any two adjacent image sensing members is a first interval, and in a distribution column direction of the image sensing members, a center interval of any two adjacent image sensing members is the first interval. The first intervals of the different image sensing member groups are different.

In a possible implementation, all the image sensing members are distributed in an array, in a distribution row direction of the image sensing members, a center interval of any two adjacent image sensing members is a second interval, and in a distribution column direction of the image sensing members, a center interval of any two adjacent image sensing members is the second interval. The camera intrinsic parameters of the at least part of the image sensing members are different.

In a possible implementation, the camera intrinsic parameters of all the image sensing members in the same image sensing member groups are the same, and the camera intrinsic parameters of the different image sensing member groups are different.

In a possible implementation, at least part of the areas where the different image sensing member groups are located overlap.

In a possible implementation, each image sensing member group includes a first image sensing member group, a second image sensing member group, a third image sensing member group and a fourth image sensing member group; the image sensing members of each image sensing member group are distributed in an array. The image sensing members of the second image sensing member group and the image sensing members of the first image sensing member group are alternatively arranged in the same row; image sensing member rows of the third image sensing member group are located in a gap between two adjacent image sensing member rows of the first image sensing member group, and the image sensing member rows of the third image sensing member group and the image sensing member rows of the first image sensing member group are alternately arranged; and image sensing member rows of the fourth image sensing member group are located between the image sensing member rows of the first image sensing member group and the image sensing member rows of the third image sensing member group, and the two rows of image sensing members of the first image sensing member group are arranged between the two adjacent image sensing member rows of the fourth image sensing member group at interval.

In a possible implementation, sizes of the image sensing members of the same image sensing member group are the same, and sizes of the image sensing members of the different image sensing member groups are different.

In a possible implementation, areas of the photosensitive components not being shielded by the shielding portions are photosensitive areas; and in the same image sensing member group, as for photosensitive components of corresponding positions of the different image sensing members, an area spliced by photosensitive areas of the photosensitive components is same as an area occupied by the photosensitive component.

In a possible implementation, each image sensing member group includes n rows and m columns of image sensing members, in each photosensitive component, the photosensitive area accounts for 1/n*m of area occupied by the photosensitive component, wherein n is a positive integer, and m is a positive integer.

In a possible implementation, two image sensing members meet the following relation:

$$\Delta x = \frac{BF}{D};$$

where Δx is a parallax of an image photographed by the two image sensing members, B is a center interval of the two image sensing members, F is a camera intrinsic parameter of the two same image sensing members, and D is a distance between a center of an object photographed on an optical axis of the image sensing members and a center of the image sensing members.

In a possible implementation, Δx is an integral multiple of a size of the photosensitive component.

In a possible implementation, a material of the shielding portion is Cr, CrOx or black resin.

In a possible implementation, the lens assembly includes a color film and a convex lens located on a side of the color film facing away from the photosensitive assembly.

In a possible implementation, each image sensing member further includes: an amplification unit electrically connected with the photosensitive assembly, a digital-to-analogue conversion unit electrically connected with the amplification unit, an image processing unit electrically connected with the digital-to-analogue conversion unit, an interface electrically connected with the image processing unit, and a control unit electrically connected with the interface.

An embodiment of the present disclosure further provides an image acquisition apparatus, including the image acquisition device provided by the embodiment of the present disclosure.

An embodiment of the present disclosure further provides an image acquisition method of the image acquisition device provided by the embodiment of the present disclosure, including: performing image photographing on an actual target photography object; estimating a photography depth of the actual target photography object according to a computing mode of a binocular parallax; obtaining data of the actual target photography object photographed by an image sensing member group corresponding to the photography depth according to the photography depth; and splicing photographed images according to the data.

In a possible implementation, the splicing photographed images according to the data includes: performing interpolation merging according to the data to splice the photographed images.

In a possible implementation, after splicing the photographed images according to the data, the image acquisition method further includes: processing foreground and background except the actual target photography object to eliminate splicing distortion under different photography depths.

An embodiment of the present disclosure further provides a manufacturing method of the image acquisition device provided by the embodiment of the present disclosure, including: forming a plurality of photosensitive components; forming shielding portions on photosensitive sides of the photosensitive components, so as to make the shielding portions shield part of photosensitive faces of the photosensitive components; transferring a photosensitive assembly with the shielding portions formed to a base substrate; and additionally arranging a lens assembly on a photosensitive side of each photosensitive assembly.

In a possible implementation, the forming shielding portions on photosensitive sides of the photosensitive components includes: depositing a shielding film layer on the photosensitive sides of the photosensitive components; and patterning the shielding film layer.

In a possible implementation, the forming shielding portions on photosensitive sides of the photosensitive components includes: forming the shielding portions on the photosensitive sides of the photosensitive components through a metal lift-off technology.

In a possible implementation, the transferring photosensitive assembly with the shielding portions formed to a base substrate includes: transferring the photosensitive assembly with the shielding portions formed to the base substrate through a transfer technology.

DETAILED DESCRIPTION

Figure 1:
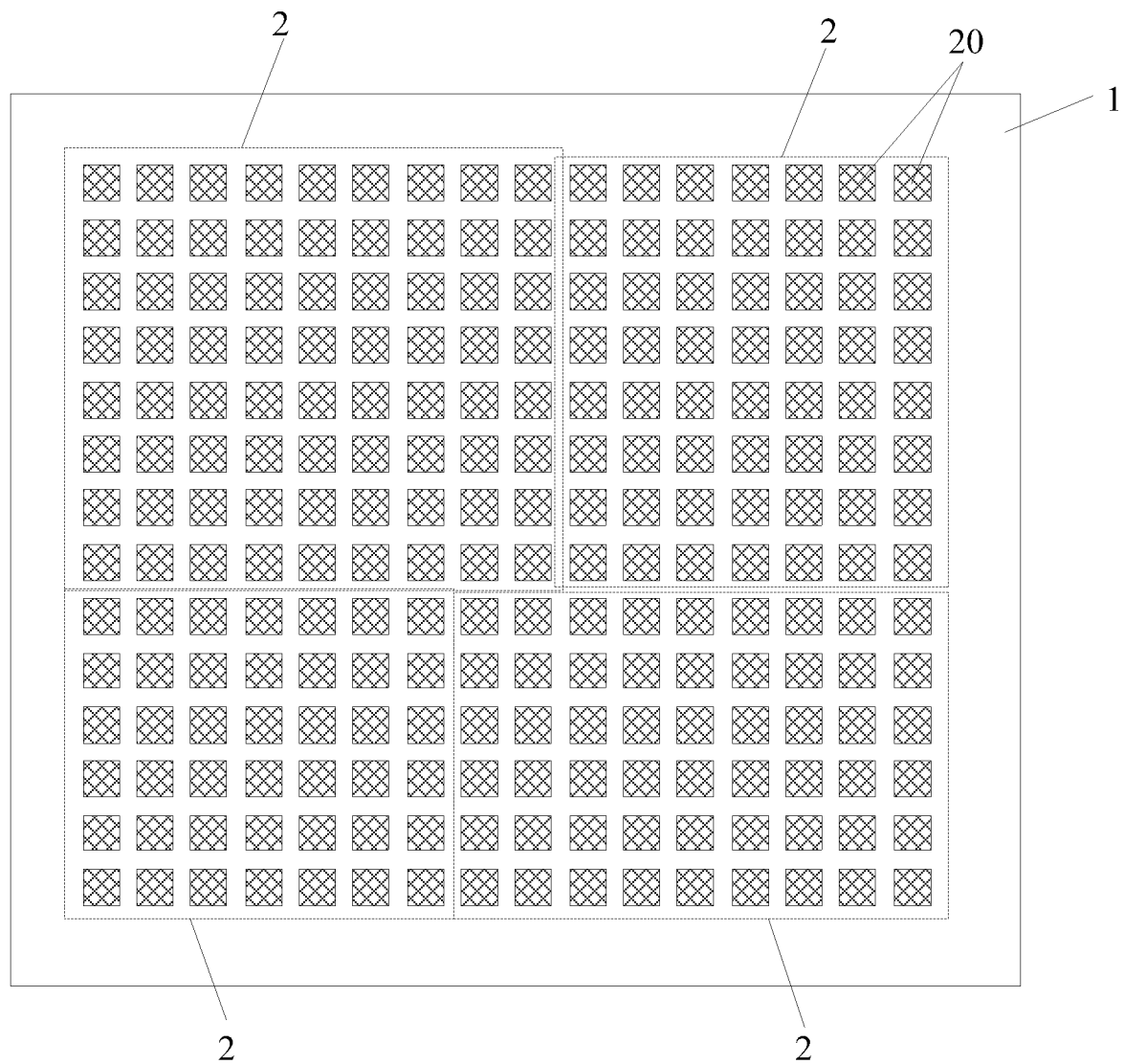
FIG. 1 is a first schematic diagram of an image acquisition device according to an embodiment of the present disclosure.
Figure 2:
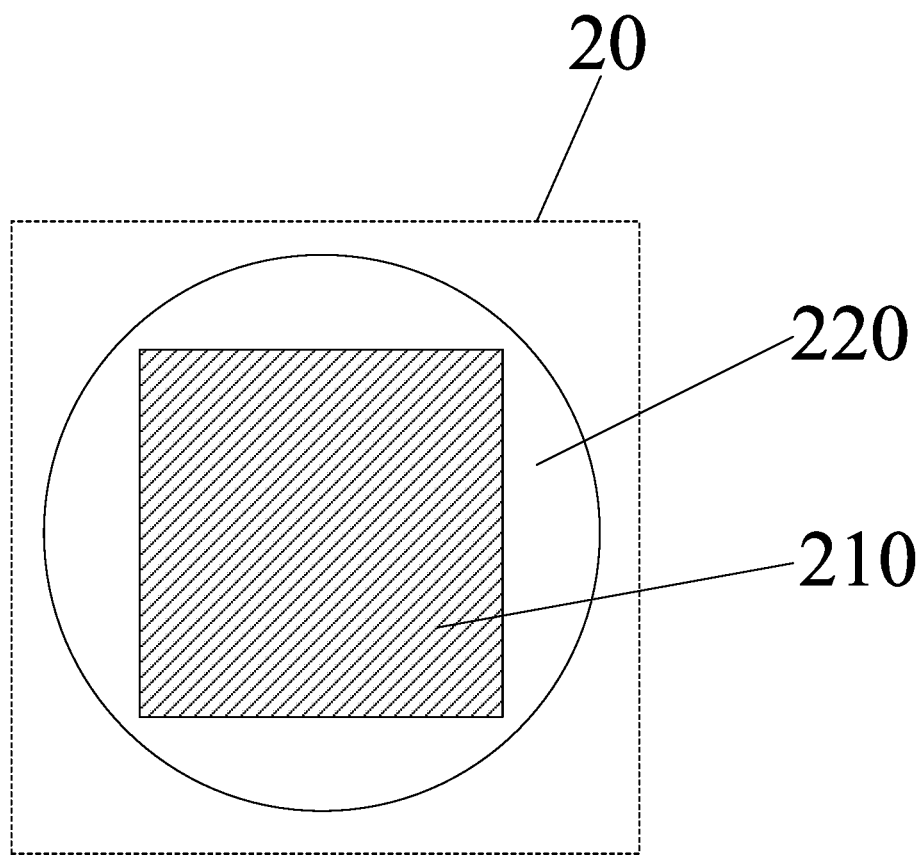
FIG. 2 is a first schematic diagram of an image sensing member according to an embodiment of the present disclosure.
Figure 3:
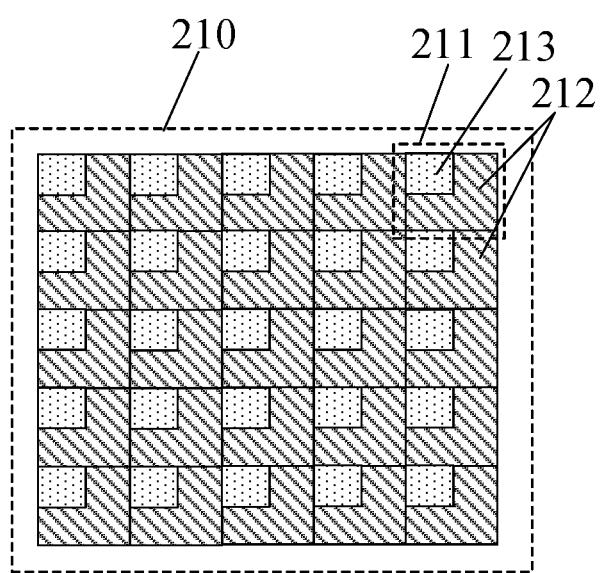
FIG. 3 is a first schematic diagram of a photosensitive assembly according to an embodiment of the present disclosure.

In order to make objectives, technical solutions and advantages of the embodiments of the present disclosure clearer, the technical solutions of the embodiments of the present disclosure will be clearly and completely described below with reference to the accompanying drawings of the embodiments of the present disclosure. Apparently, the described embodiments are some, but not all, embodiments of the present disclosure. Based on the described embodiments of the present disclosure, all other embodiments obtained by those of ordinary skill in the art without creative work shall fall within the protection scope of the present disclosure.

Unless otherwise indicated, technical terms or scientific terms used in the present disclosure should have the ordinary meaning as understood by those of ordinary skill in the art to which the present disclosure pertains. "First", "second" and similar words used in the present disclosure do not represent any order, quantity or importance, and are only used for distinguishing different constitute parts. "Include" or "contain" and similar words mean that the elements or objects appearing before the words cover the elements or objects recited after the words and their equivalents, but do not exclude other elements or objects. The words "connect" or "link" or the like are not limited to physical or mechanical connection, but may include electrical connection, whether direct or indirect. "Up", "down", "left", "right" and the like are only used for representing a relative position relationship, and after an absolute position of a described object is changed, the relative position relationship may also be changed accordingly.

In order to make the following specification of the embodiment of the present disclosure clear and concise, detailed descriptions of known functions and known parts are omitted in the present disclosure.

Referring to FIG. 1, FIG. 2, FIG. 3, FIG. 5A and FIG. 5B, the present disclosure provides an image acquisition device, including:
  a base substrate 1;
  a plurality of image sensing member groups 2, where the image sensing member groups 2 are disposed on a side of the base substrate 1, and each image sensing member group 2 includes a plurality of image sensing members 20; each image sensing member 20 includes a photosensitive assembly 210 with a plurality of photosensitive components 211, and a lens assembly 220 covering a photosensitive side of the photosensitive assembly 210; specifically, the image sensing member 20 may be a CIS chip; and
  a plurality of shielding portions 212, where the plurality of shielding portions 212 correspond to the photosensitive components 211 in a one-to-one correspondence, the shielding portion is disposed between the photosensitive component 211 and the lens assembly 220, and shields some of the area of photosensitive surface of the photosensitive component 211, so as to allow the photosensitive component 211 has a photosensitive area 213; each image sensing member group 2 corresponds to a photography depth D, the plurality of image sensing member groups 2 correspond to a plurality of photography depths D, and the plurality of image sensing member groups 2 at least have one of the following differences:
  a difference in arrangement modes of the image sensing members 20 in the image sensing member groups 2; and
  a difference in camera intrinsic parameters F of the image sensing members 20 in the image sensing member groups 2.

In some embodiments, there may be one of the two differences, or both of them.

In the embodiment of the present disclosure, the image acquisition device has the plurality of image sensing member groups 2, and for the plurality of image sensing member groups 2: the arrangement modes of the image sensing members 20 in the image sensing member groups 2 are different, or the camera intrinsic parameters F of the image sensing members 20 in the image sensing member groups 2 are different; so each image sensing member group 2 corresponds to one photography depth D, and the plurality of image sensing member groups 2 correspond to a plurality of photography depths D. When an actual target photography object is photographed, according to a photography depth of the actual target photography object, data of the actual target photography object photographed by the image sensing member group 2 corresponding to the photography depth. The photographed data of the actual target photography object are spliced according to the image sensing member group 2 to form a photography image, the size of an equivalent small pixel is achieved on a physical layer, thereby improving a resolution ratio, and improving the quality of a photography image obtained.

Figure 5A:
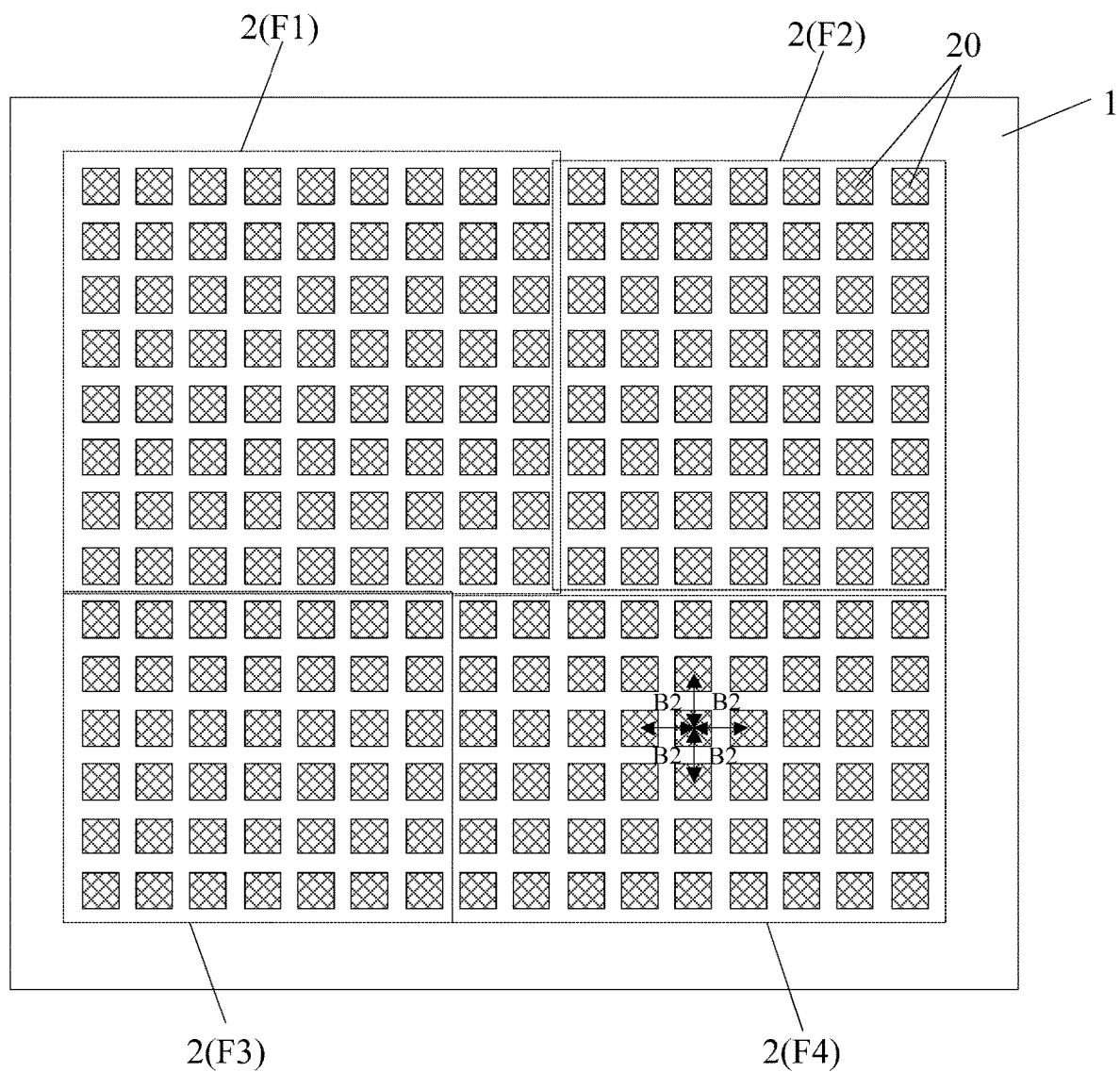
FIG. 5A is a second schematic diagram illustrating for an arrangement mode of image sensing members according to an embodiment of the present disclosure.
Figure 5B:
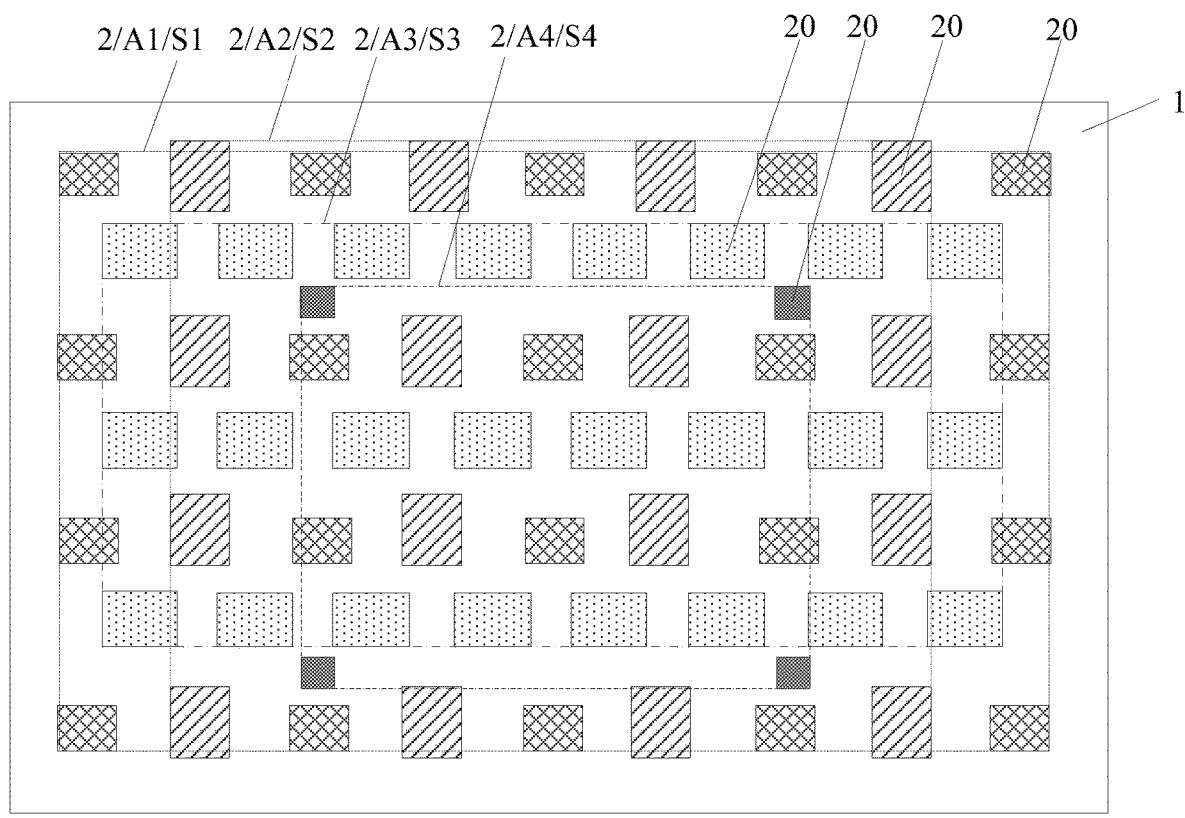
FIG. 5B is a third schematic diagram illustrating for an arrangement mode of image sensing members according to an embodiment of the present disclosure.

It needs to be noted that FIG. 1, FIG. 5A and FIG. 5B only take an example that the image acquisition device has four image sensing member groups 2 for illustration. During specific implementation, the image acquisition device may have more image sensing member groups 2, and which is not limited in the embodiment of the present disclosure. During specific implementation, the quantity of the image sensing members 20 included in each image sensing member group 2 may be the same, and may also be different.

Figure 4:
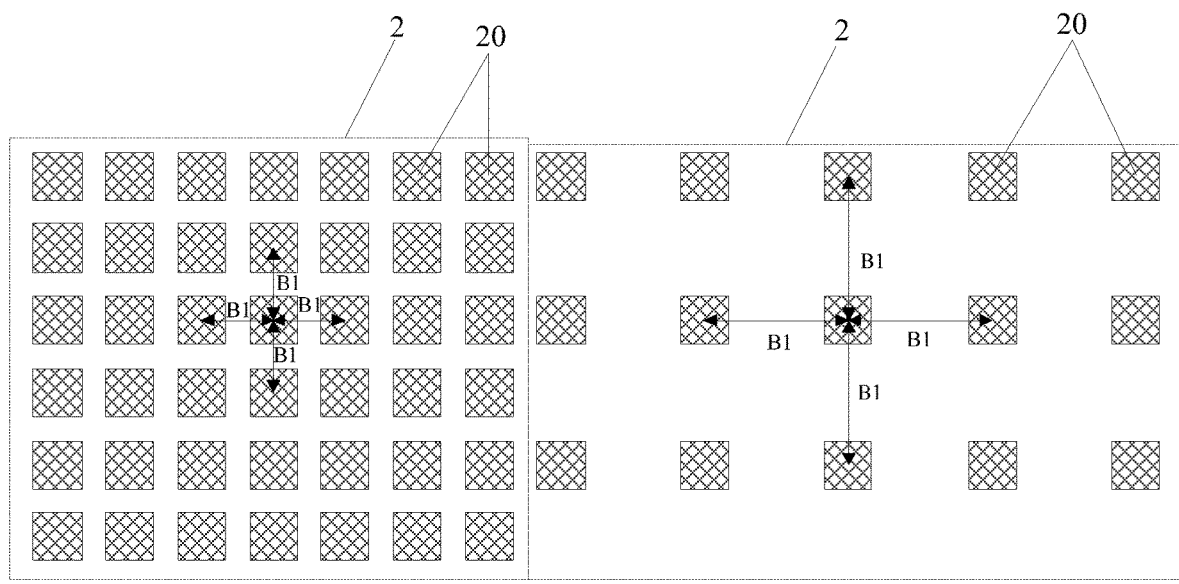
FIG. 4 is a first schematic diagram illustrating for an arrangement mode of image sensing members according to an embodiment of the present disclosure.

During specific implementation, with reference to FIG. 1, FIG. 4 and FIG. 5A, different image sensing member groups 2 are located in different areas, and the areas where the different image sensing member groups 2 are located do not overlap each other. Specifically, the different image sensing member groups 2 can have different photography depths by controlling the arrangement modes of the image sensing members 20 in the different areas to be different, or by controlling the camera intrinsic parameters F of the image sensing members 20 in the different areas to be different. Specifically, for example, with reference to FIG. 1, the arrangement modes of the image sensing members 20 in four different areas in dotted box may be the same, and the camera intrinsic parameters of the image sensing members 20 in the four different areas may be different, so as to implement that the different image sensing member groups 2 have different photography depths. The arrangement modes of the image sensing members 20 of the four different areas in dotted box may be different, and the camera intrinsic parameters of the image sensing members 20 of the four different areas in dotted box may be different, so as to implement that the different image sensing member groups 2 have different photography depths. The arrangement mode of the image sensing members 20 in an upper left area and the arrangement mode of the image sensing members 20 in a lower left area may be the same, the camera intrinsic parameters of image sensing members 20 in the two left areas are different, the image sensing members 20 in an upper right area and the image sensing members 20 in a lower right area are the same in camera intrinsic parameter and different in arrangement mode, so as to implement that the different image sensing member groups 2 have different photography depths.

Specifically, in a possible implementation, referring to FIG. 4, the camera intrinsic parameters F of all the image sensing members 20 may be the same, and the arrangement modes of the image sensing members 20 of the different image sensing member groups 2 may be different. Specifically, in the same image sensing member group 2, the image sensing members 20 are distributed in an array, in a distribution row direction of the image sensing members 20, a center interval of any two adjacent image sensing members 20 is a first interval B1, and in a distribution column direction of the image sensing members 20, a center interval of any two adjacent image sensing members 20 is a first interval B1; and the first intervals B1 of the different image sensing member groups 2 are different. For example, in FIG. 4, an interval between two adjacent image sensing members 20 in the left image sensing member group 2 is the first interval B1, different from an interval between two adjacent image sensing members 20 in the right image sensing member group 2 being the first interval B1. In this case, the camera intrinsic parameters F of all the image sensing members 20 are the same, the arrangement modes of the different image sensing member groups 2 are different, and thus the image sensing member groups 2 may correspond to the different photography depths.

In a possible implementation, with reference to FIG. 5A, all the image sensing members may be distributed in an array, in the distribution column direction of the image sensing members 20, the center interval of the any two adjacent image sensing members 20 is a second interval, and in the distribution column direction of the image sensing members 20, the center interval of the any two adjacent image sensing members 20 is a second interval B2; and the camera intrinsic parameters F of at least part of the image sensing members 20 are different. Specifically, the camera intrinsic parameters F of all the image sensing members 20 in the same image sensing member group 2 are the same, and the camera intrinsic parameters F of the different image sensing member groups 2 are different. Specifically, for example, with reference to FIG. 5A, the camera intrinsic parameter corresponding to the upper left image sensing member group 2 is F1, the camera intrinsic parameter corresponding to the upper right image sensing member group 2 is F2, the camera intrinsic parameter corresponding to the lower left image sensing member group 2 is F3, the camera intrinsic parameter corresponding to the lower right image sensing member group 2 is F4, all the image sensing members are in the same arrangement mode, so that the different image sensing member groups 2 correspond to different camera intrinsic parameters, and then the image acquisition device has the plurality of different depths D.

During specific implementation, referring to FIG. 5B, the different image sensing member groups 2 may be arranged in an interpolation mode, that is, at least part of the areas where the different image sensing member groups 2 are located overlap. For example, with reference to FIG. 5B, the image display device includes: a first image sensing member group A1, a second image sensing member group A2, a third sensing member group A3, and a fourth sensing member group A4. An area where the first image sensing member group A1 is located is S1, an area where the second image sensing member group A2 is located is S2, an area where the third sensing member group A3 is located is S3, an area where the fourth sensing member group A4 is located is S4, and S1, S2, S3, and S4 have an overlapping area.

Specifically, with reference to FIG. 5B, the image sensing members 20 of each image sensing member group 2 are distributed in an array; the image sensing member 20 of the second image sensing member group A2 and the image sensing member 20 of the first image sensing member group A1 are alternatively arranged in the same row; image sensing member rows of the third sensing member group A3 are located in a gap between two adjacent image sensing member rows of the first image sensing member group A1, and image sensing member rows of the third sensing member group A3 and the image sensing member rows of the first image sensing member group A1 are alternatively arranged; and image sensing member rows of the fourth sensing member group A4 are located between the image sensing member rows of the first image sensing member group A1 and the image sensing member rows of the third sensing member group A3, and two rows of image sensing members of the first image sensing member group A1 are arranged between the two adjacent image sensing member rows of the fourth sensing member group A4.

Specifically, with reference to FIG. 5B, sizes of the image sensing members 20 of the same image sensing member group 2 may be the same, and sizes of the image sensing members 20 of the different image sensing member groups 2 may be different. Specifically, the sizes of the image sensing members 20 of the different image sensing member groups 2 may be the same. Specifically, in the image sensing member 20, a size of the photosensitive assembly 210 is generally smaller than a size of each lens assembly 220, and therefore, the size of the image sensing member 20 may be specifically understood as the size of the larger lens assembly 220. The size of the lens assembly 220 may specifically be a size of the largest part in the member. Specifically, if a shape of the largest part is a circle, the size of the lens assembly 220 may be understood as a diameter of the circle part.

Figure 6:
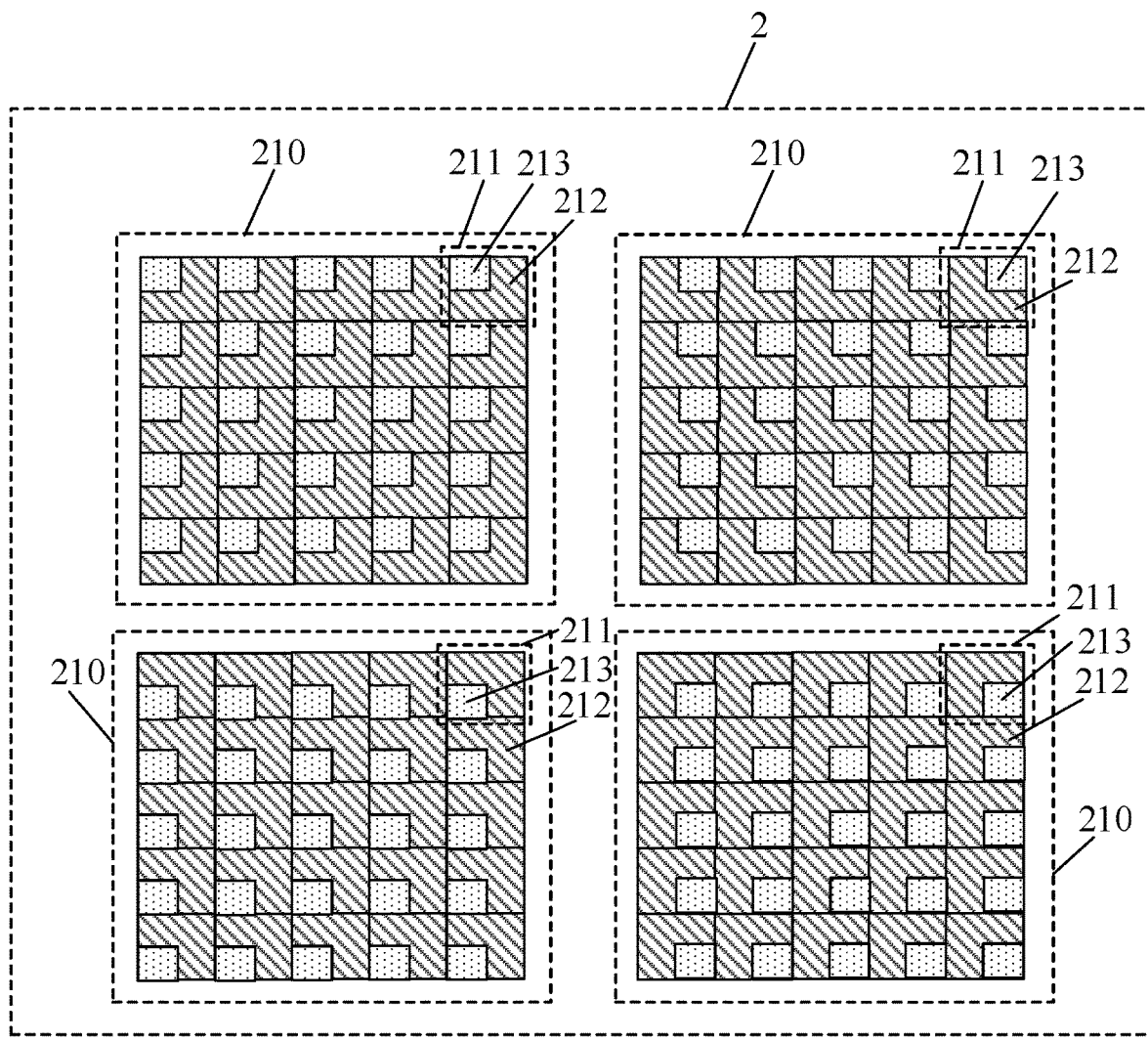
FIG. 6 is a first schematic diagram illustrating for an arranging mode of shielding portions according to an embodiment of the present disclosure.

In a possible implementation, referring to FIG. 6, the area of the photosensitive component 211 not shielded by the shielding portion 212 is the photosensitive area 213; and in the same image sensing member group 2, as for the photosensitive components 211 of the corresponding positions of the different photosensitive assemblies 210, the area spliced by the corresponding photosensitive areas 213 is the same as the area occupied by the photosensitive component 211. Specifically, for example, with reference to FIG. 6, in the same image sensing member group 2, as for the photosensitive component 211 in the first row and first column in each photosensitive assembly 210, an area spliced by the photosensitive areas 213 in the first row and first column in each photosensitive assembly 20 is the same as an area occupied by the photosensitive component 211 in the first row and first column.

Specifically, the image sensing member group 2 includes n rows and m columns of i photosensitive assemblies 210, in each photosensitive component 211, the photosensitive area 213 accounts for 1/n*m of the area of the photosensitive component 211, as such, for an area of each photosensitive component 211, a photosensitive area equivalent to the area of the photosensitive component 211 is obtained by splicing the photosensitive areas 213 of the plurality of photosensitive assemblies 20, where n is the positive integer, and m is the positive integer. Specifically, with reference to FIG. 6, each image sensing member group 2 includes two rows and two columns of the photosensitive assemblies 20, and in each photosensitive component 211, the photosensitive area 213 accounts for ½*2 of the area of the photosensitive component 211.

In a possible implementation, two image sensing members 20 meet the following relation:

$$\Delta x = \frac{BF}{D};$$

where $\Delta x$ is a parallax of an image photographed by the two image sensing members 20, B is a center interval of the two image sensing members 20, F is a camera intrinsic parameter of the two same image sensing members 20, and D is a distance between a center of an object photographed on an optical axis of the image sensing members 20 and a center of the image sensing members 20. Specifically, Δx is an integral multiple of a size of a photosensitive component 211, so as to implement a result of equivalent small pixels. Specifically, for example, if the photosensitive component 211 is a square, the size of the photosensitive component 211 may be understood as a side length of the square; or for example, if the photosensitive component 211 is a circle, the size of the photosensitive component 211 may be understood as a diameter of the circle.

Figure 7:
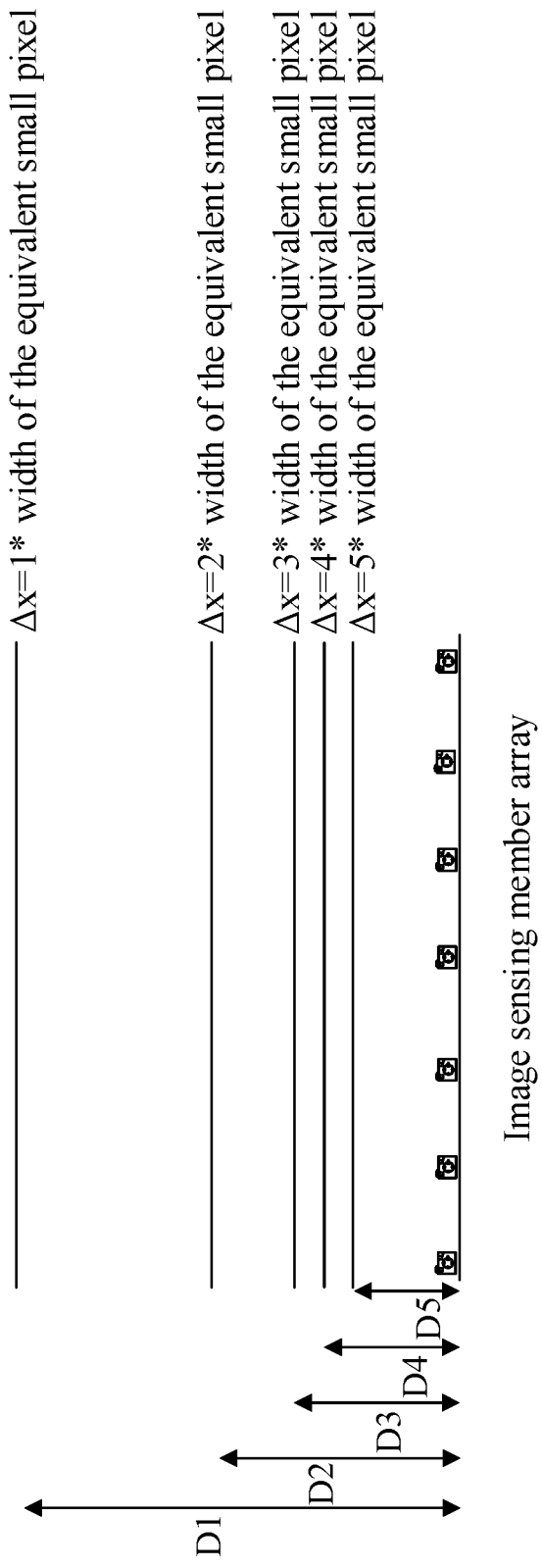
FIG. 7 is a schematic diagram illustrating a relationship of different photography depths corresponding to different parallaxes according to an embodiment of the present disclosure.
Figure 8:
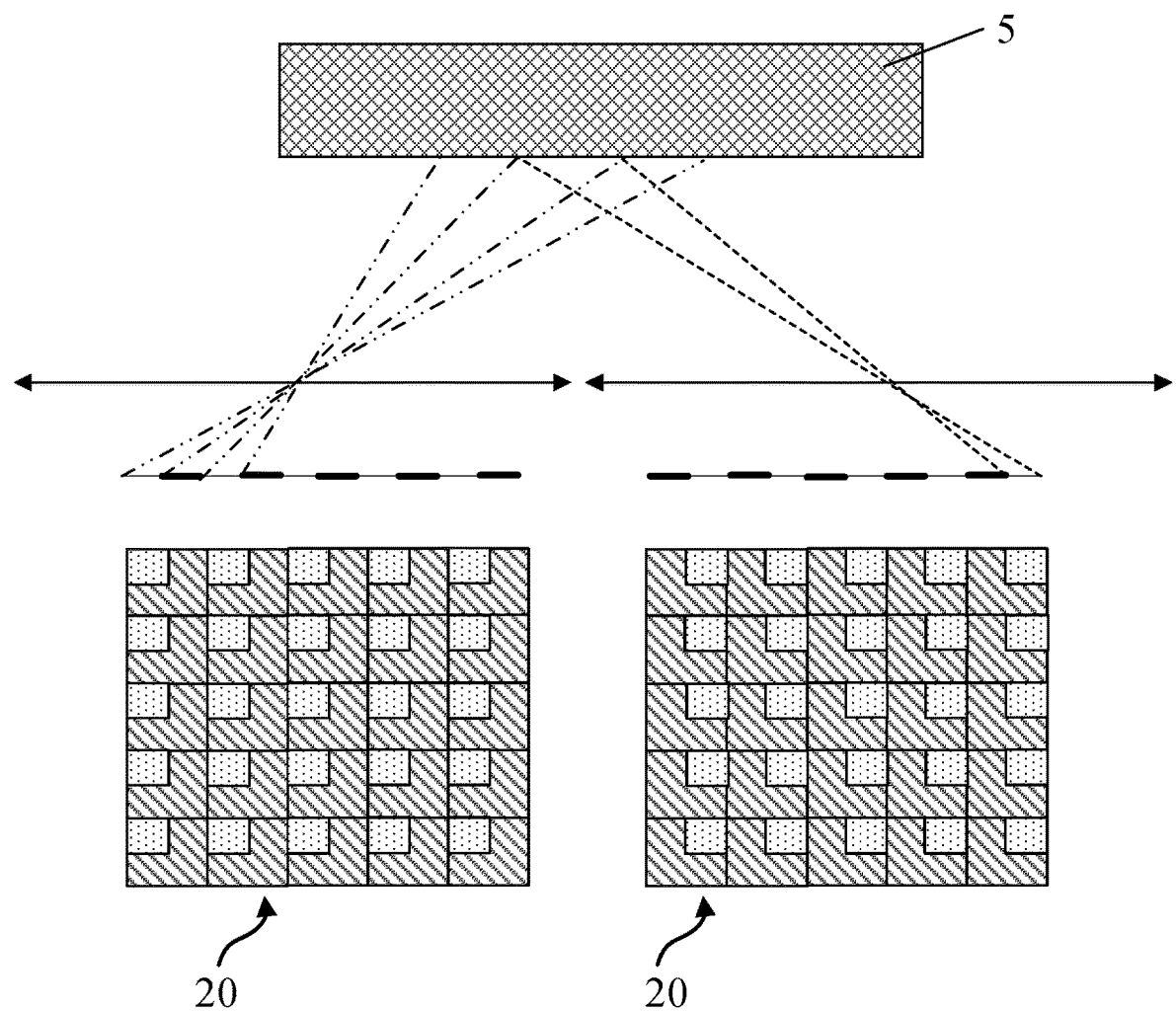
FIG. 8 is a schematic diagram illustrating photographing of equivalent small pixels according to an embodiment of the present disclosure.

With reference to FIG. 7, considering a parallax formula, $$\Delta x = \frac{BF}{D},$$

when Δx is equal to a width of an equivalent small pixel, a corresponding paragraph depth is D1; when Δx is twice the width of the equivalent small pixel, a corresponding paragraph depth is D2; when Δx is a triple the width of the equivalent small pixel, a corresponding paragraph depth is D3; and when Δx is four times the width of the equivalent small pixel, a corresponding paragraph depth is D4, Δx is five times the width of the equivalent small pixel, a corresponding paragraph depth is D5, obviously, D1=2*D2=3*D3=4*D4=5*D5= . . . Obviously, these discrete depth planes get closer as they get closer to a photography plane, thus, according to the photography depths of application scene requirements, there are two points for consideration when design the arrangement modes of the image sensing members 20: the first is to control a distribution interval B; and the second is to control a camera intrinsic parameter F. Multiple distribution modes combination may be implemented with the same camera (with the same camera intrinsic parameter F) by adjusting the distribution interval B, so that more depths capable of being exactly spliced are obtained. By adjusting the camera intrinsic parameter F, more depths capable of being exactly spliced may be obtained through different cameras (with different camera intrinsic parameters F) and the same distribution rule, and the above design principles are intended to implement exact splicing under more depths in the space. During specific photographing, with reference to FIG. 8, there are two adjacent image sensing members 20 (camera modules) at the left side and the right side in FIG. 8. When an object is photographed, pixels of the left image sensing member 20 and the right image sensing member 20 may be exactly intersected and complementary on a certain photography depth, and an effect is shown as different dotted lines in FIG. 8. That is, a shielded part of a pixel (the photosensitive component 211) of the left image sensing member 20 is exactly filled by that the right image sensing member 20. In this way, the equivalent small pixel size is implemented physically, thereby improving the resolution ratio.

In a possible implementation, a material of the shielding portion 212 is Cr, CrOx or black resin.

Figure 9:
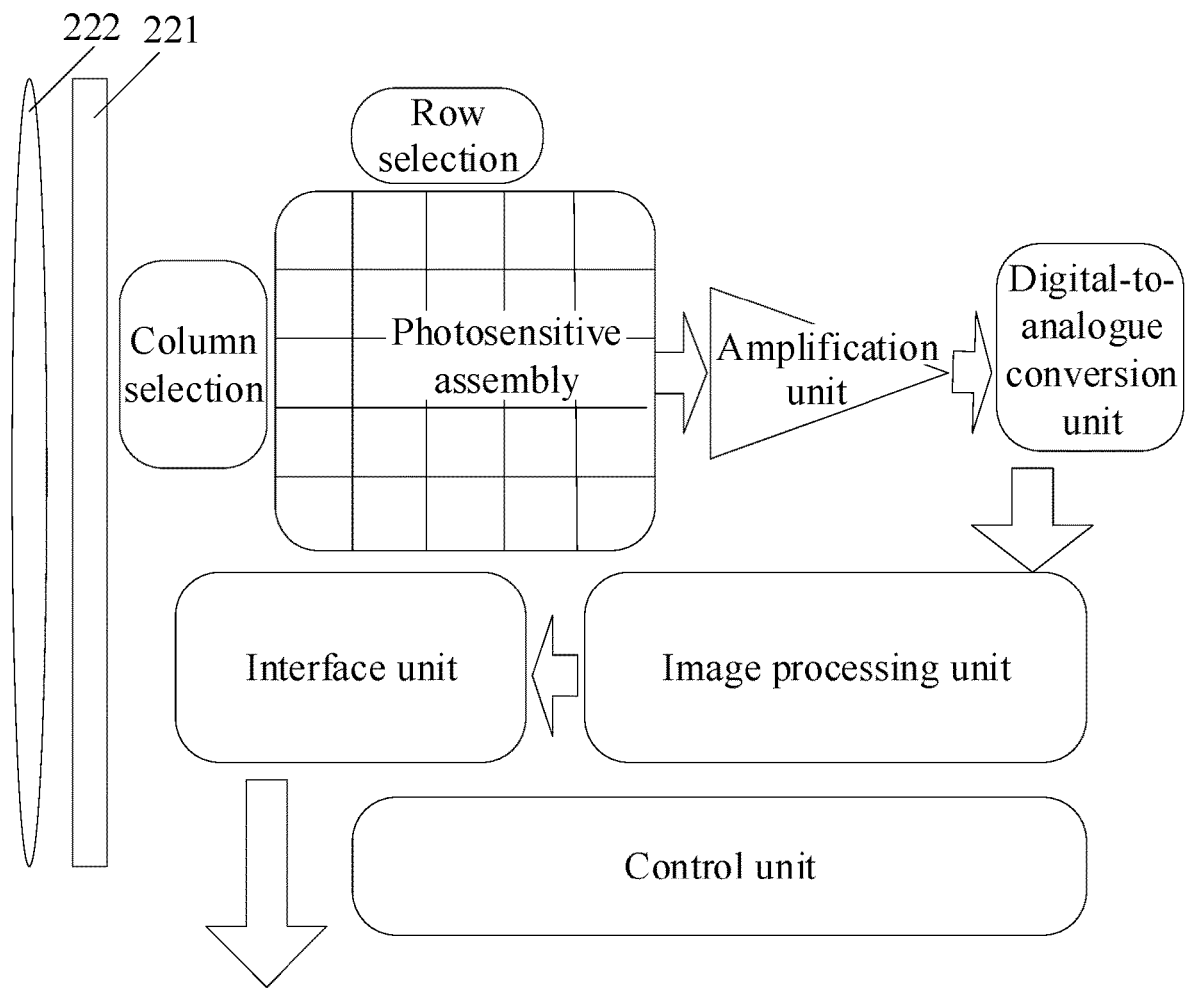
FIG. 9 is a second schematic structural diagram of an image sensing member according to an embodiment of the present disclosure.

During specific implementation, with reference to FIG. 9, the lens assembly 220 includes a color film 221 and a convex lens 222 located on a side of the color film 221 facing away from the photosensitive assembly 210.

During specific implementation, with reference to FIG. 9, the image sensing member 20 further includes: an amplification unit electrically connected with the photosensitive assembly, a digital-to-analogue conversion unit (ADC) electrically connected with the amplification unit, an image processing unit (ISP) electrically connected with the digital-to-analogue conversion unit, an interface (namely an interface unit in FIG. 9) electrically connected with the image processing unit, and a control unit electrically connected with the port. Specifically, the image processing unit (ISP) may include demosaicing, white balance, color correction, Gamma correction, and a color spatial switching unit. The interface unit may specifically include a mobile industry processor interface (MIPI for short) and a FIFO. The control unit may specifically include a phase-locked loop, a sequential logic and a register.

Based on the same inventive concept, an embodiment of the present disclosure further provides an image acquisition apparatus, including the image acquisition device provided by the embodiment of the present disclosure.

Figure 10:
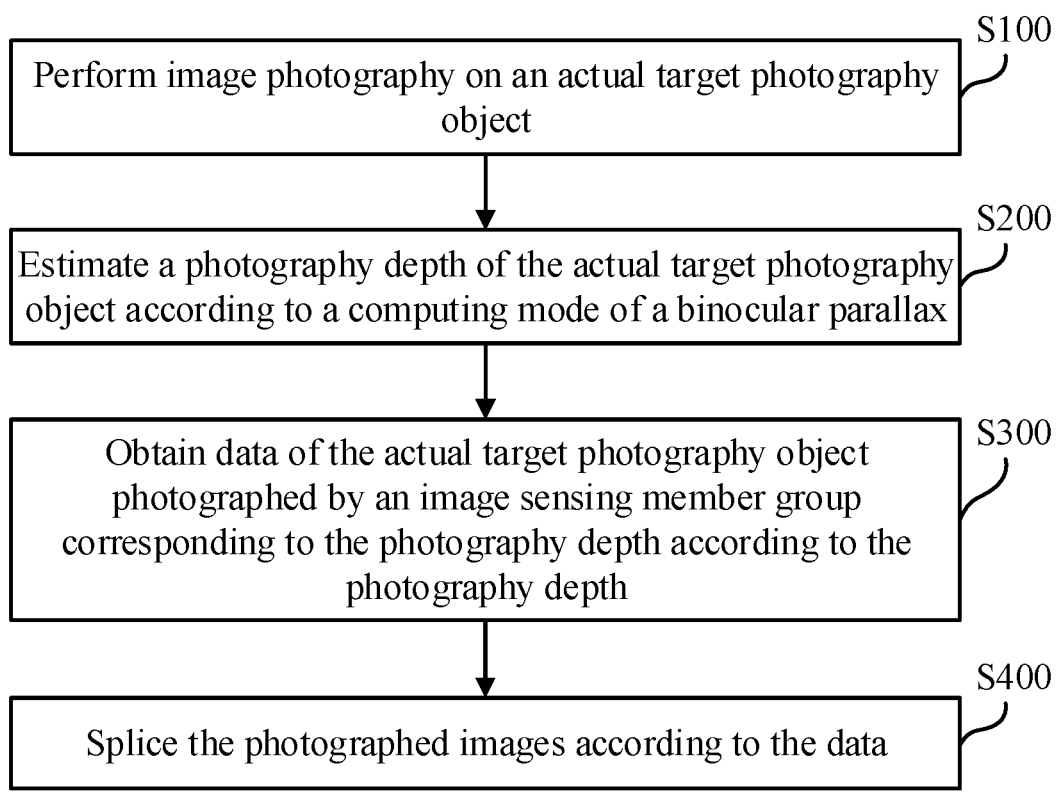
FIG. 10 is a flow schematic diagram of an image acquisition method according to an embodiment of the present disclosure.

Based on the same inventive concept, an embodiment of the present disclosure further provides an image acquisition method of the image acquisition device provided by the embodiment of the present disclosure, referring to FIG. 10, including the following steps.

Step S100, image photographing is performed on an actual target photography object.

Step S200, a photography depth of the actual target photography object is estimated according to a computing mode of a binocular parallax.

Step S300, data of the actual target photography object photographed by image sensing member groups corresponding to the photography depth are obtained according to the photography depth.

Step S400, photography images are spliced according to the data. Specifically, the splicing photography images according to the data includes: interpolation merging is performed according to the data, so as to splice the photography images.

In a possible implementation, after step S400, that is, after the photography images are spliced according to the data, the image acquisition method further includes:

foreground and background except the actual target photography object are processed, so as to eliminate splicing distortion at different photography depths.

Figure 11:
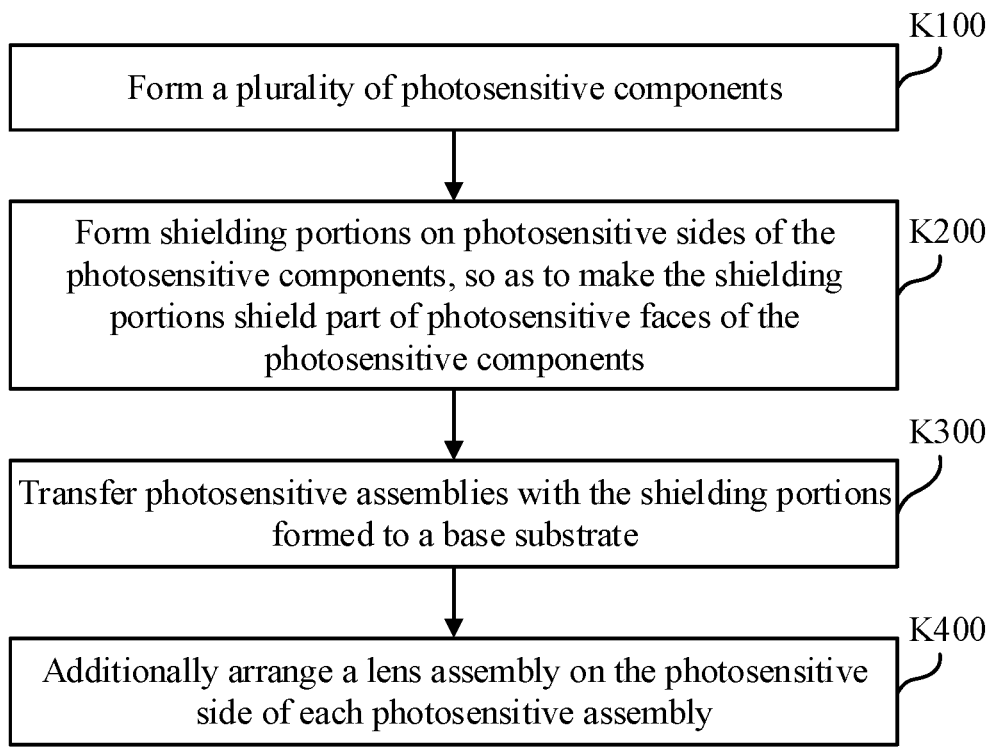
FIG. 11 is a flow schematic diagram of a manufacturing method of an image acquisition device according to an embodiment of the present disclosure.

Based on the same inventive concept, an embodiment of the present disclosure further provides a manufacturing method of the image acquisition device provided by the embodiment of the present disclosure, referring to FIG. 11, including the following steps.

Step K100, a plurality of photosensitive components are formed.

Step K200, shielding portions are formed on photosensitive sides of the photosensitive components, so as to make the shielding portions shield part of photosensitive surfaces of the photosensitive components.

Specifically, the forming shielding portions on photosensitive sides of the photosensitive components, includes:

a shielding film layer is deposited on the photosensitive sides of the photosensitive components; and
the shielding film layer is patterned.

Alternatively, the forming shielding portions on photosensitive sides of the photosensitive components may include:

the shielding portions are formed on the photosensitive sides of the photosensitive components through a metal lift-off technology.

Step K300, the photosensitive assemblies with the shielding portions formed are transferred to a base substrate; specifically, the transferring the photosensitive assemblies with the shielding portions formed to a base substrate includes: the photosensitive assemblies with the shielding portions formed are transferred to the base substrate through a transfer technology.

Step K400, a lens assembly is arranged on the photosensitive side of each photosensitive assembly.

In the embodiment of the present disclosure, the image acquisition device has the plurality of image sensing member groups 2, the arrangement modes of the image sensing members 20 in the plurality of image sensing member groups 2 are different, or the camera intrinsic parameters F of the image sensing members 20 in the image sensing member groups 2 are different. Each image sensing member group 2 corresponds to one photography depth D, and the plurality of image sensing member groups 2 correspond to the plurality of photography depths D. When the actual target photography object is photographed, the data of the actual target photography object photographed by the image sensing member group 2 corresponding to the photography depth are obtained according to the photography depth of the actual target photography object, the photographed data of the actual target photography object are spliced to form the photography image according to the image sensing member group 2, actually, the equivalent small pixel size is achieved physically, thereby improving the resolution ratio, and obtaining the photography image with the higher quality.

Those skilled in the art should understand that the embodiments of the present disclosure may be provided as the method, a system, or a computer program product. Therefore, the present disclosure may adopt a complete hardware embodiment, a complete software embodiment, or a form of combining software and hardware aspect embodiments. In addition, the present disclosure may adopt a form of implementing the computer program product on one or more computer usable storage media (including but not limited to a magnetic disk memory, a CD-ROM, an optical memory, etc.) including computer usable program codes.

The present disclosure is described with reference to the method, the device (system), and a flow diagram and/or a block diagram of the computer program product. It should be understood that computer program instructions may implement each flow and/or block in the flow diagram and/or the block diagram, and a combination of flows and/or blocks in the flow diagram and/or the block diagram. These computer program instructions may be provided to a general-purpose computer, a dedicated computer, an embedded processor or other processors of programmable processing devices to generate a machine, so that instructions executed by the computer or other processors of the programmable processing devices generate an apparatus with specified functions for implementing in one flow or more flows in the flow diagram and/or one block or more blocks in the block diagram.

These computer program instructions may also be stored in a computer readable memory capable of guiding the computer or other programmable processing devices to work in a specific mode, so that the instructions stored in the computer readable memory generate manufactures including instruction apparatuses, and the instruction apparatuses implement the specified functions in one flow or more flows in the flow diagram and/or one block or more blocks in the block diagram.

These computer program instructions may also be loaded on the computer or other programmable data processing devices, so that a series of steps are executed on the computer or other programmable data processing devices to generate processing implemented by the computer, and thus the instructions executed on the computer or other programmable data processing devices provide the steps for implementing the specific functions in one flow or more flows in the flow diagram and/or one block or more blocks in the block diagram.

Although the preferred embodiments of the present disclosure have been described, those skilled in the art can make additional changes and modifications on these embodiments once they know the basic creative concept. So the appended claims are intended to include the preferred embodiments and all changes and modifications that fall into the scope of the present disclosure.

Apparently, those skilled in the art may perform various changes and modifications on the embodiments of the present disclosure without departing from the spirit and scope of the embodiments of the present disclosure. In this way, if these changes and modifications on the embodiments of the present disclosure fall in the scope of the claims of the present disclosure and their equivalent technologies, the present disclosure is intended to include these changes and modification.

What is claimed is:

1. An image acquisition device, comprising:
a base substrate;
a plurality of image sensing member groups, disposed on a side of the base substrate, wherein each image sensing member group comprises a plurality of image sensing members; and each image sensing member comprises a photosensitive assembly with a plurality of photosensitive components, and a lens assembly covering a photosensitive side of the photosensitive assembly; and
a plurality of shielding portions corresponding to the plurality of photosensitive components in a one-to-one correspondence, wherein the shielding portion is located between the photosensitive component and the lens assembly, and shield a part of an area of photosensitive surface of the photosensitive component; each image sensing member group corresponds to a photography depth, and the plurality of image sensing member groups correspond to a plurality of photography depths;
wherein, for the plurality of image sensing member groups, at least one of following is comprised:
arrangement modes of the image sensing members in the plurality of image sensing member groups are different; or
camera intrinsic parameters of the image sensing members in the plurality of image sensing member groups are different;
wherein an area of the photosensitive component not being shielded by the shielding portion is a photosensitive area; and
in a same image sensing member group, as for photosensitive components of corresponding positions of the different image sensing members, an area spliced by photosensitive areas of the photosensitive components is same as an area occupied by the photosensitive component.

2. The image acquisition device according to claim 1, wherein different image sensing member groups are located in different areas, and areas where the different image sensing member groups are located do not overlap each other.

3. The image acquisition device according to claim 2, wherein camera intrinsic parameters of all the image sensing members are same, and arrangement modes of the image sensing members in the different image sensing member groups are different.

4. The image acquisition device according to claim 3, wherein in a same image sensing member group, the image sensing members are distributed in an array;
  in a distribution row direction of the image sensing members, a center interval of any two adjacent image sensing members is a first interval, and in a distribution column direction of the image sensing members, a center interval of any two adjacent image sensing members is the first interval; and
  first intervals of the different image sensing member groups are different.

5. The image acquisition device according to claim 2, wherein all the image sensing members are distributed in an array, in a distribution row direction of the image sensing members, a center interval of any two adjacent image sensing members is a second interval, and in a distribution column direction of the image sensing members, a center interval of any two adjacent image sensing members is the second interval; and
  camera intrinsic parameters of the at least part of the image sensing members are different.

6. The image acquisition device according to claim 5, wherein camera intrinsic parameters of all the image sensing members in a same image sensing member group are same, and camera intrinsic parameters of the different image sensing member groups are different.

7. The image acquisition device according to claim 1, wherein at least part of areas where the different image sensing member groups are located overlap.

8. The image acquisition device according to claim 7, wherein the image sensing member groups comprises a first image sensing member group, a second image sensing member group, a third image sensing member group and a fourth image sensing member group; image sensing members in each image sensing member group are distributed in an array;
  image sensing members of the second image sensing member group and image sensing members of the first image sensing member group are alternatively arranged in a same row;
  image sensing member rows of the third image sensing member group are located in a gap between two adjacent image sensing member rows of the first image sensing member group, and the image sensing member rows of the third image sensing member group and the image sensing member rows of the first image sensing member group are alternately arranged; and
  image sensing member rows of the fourth image sensing member group are located between the image sensing member rows of the first image sensing member group and the image sensing member rows of the third image sensing member group, and two rows of image sensing members of the first image sensing member group are arranged between two adjacent image sensing member rows of the fourth image sensing member group.

9. The image acquisition device according to claim 7, wherein sizes of image sensing members of a same image sensing member group are same, and sizes of image sensing members of the different image sensing member groups are different.

10. The image acquisition device according to claim 1, wherein the image sensing member group comprises n rows and m columns of image sensing members, in each photosensitive component, the photosensitive area accounts for 1/n*m of the area occupied by the photosensitive component, wherein n is a positive integer, and m is a positive integer.

11. The image acquisition device according to claim 1, wherein two image sensing members meet a following relation:

$$\Delta x = \frac{BF}{D};$$

wherein, $\Delta x$ is a parallax of an image photographed by the two image sensing members, B is a center interval of the two image sensing members, F is a camera intrinsic parameter of the two same image sensing members, and D is a distance between a center of an object photographed on an optical axis of the image sensing members and a center of the image sensing members.

12. The image acquisition device according to claim 11, wherein $\Delta x$ is an integral multiple of a size of the photosensitive component.

13. The image acquisition device according to claim 1, wherein a material of the shielding portion is Cr, CrOx or black resin.

14. An image acquisition apparatus, comprising the image acquisition device according to claim 1.

15. The image acquisition device according to claim 1, wherein each image sensing member further comprises:
  an amplification unit electrically connected with the photosensitive assembly;
  a digital-to-analogue conversion unit electrically connected with the amplification unit;
  an image processing unit electrically connected with the digital-to-analogue conversion unit;
  an interface electrically connected with the image processing unit; and
  a control unit electrically connected with the interface.

16. An image acquisition method of an image acquisition device, wherein the image acquisition device comprises:
  a base substrate;
  a plurality of image sensing member groups, disposed on a side of the base substrate, wherein each image sensing member group comprises a plurality of image sensing members; and each image sensing member comprises a photosensitive assembly with a plurality of photosensitive components, and a lens assembly covering a photosensitive side of the photosensitive assembly; and
  a plurality of shielding portions corresponding to the plurality of photosensitive components in a one-to-one correspondence, wherein the shielding portion is located between the photosensitive component and the lens assembly, and shield a part of an area of photosensitive surface of the photosensitive component; each image sensing member group corresponds to a photography depth, and the plurality of image sensing member groups correspond to a plurality of photography depths;
  wherein, for the plurality of image sensing member groups, at least one of following is comprised:
  arrangement modes of the image sensing members in the plurality of image sensing member groups are different; or
  camera intrinsic parameters of the image sensing members in the plurality of image sensing member groups are different;
  wherein an area of the photosensitive component not being shielded by the shielding portion is a photosensitive area; and
  in a same image sensing member group, as for photosensitive components of corresponding positions of the different image sensing members, an area spliced by photosensitive areas of the photosensitive components is same as an area occupied by the photosensitive component;

wherein the image acquisition method comprises:

performing image photographing on an actual target photography object;

estimating a photography depth of the actual target photography object according to a computing mode of a binocular parallax;

obtaining data of the actual target photography object photographed by an image sensing member group corresponding to the photography depth according to the photography depth; and splicing photographed images according to the data.

17. The image acquisition method according to claim 16, wherein the splicing photographed images according to the data comprises:

performing interpolation merging according to the data to splice the photographed images.

18. The image acquisition method according to claim 17, wherein after splicing the photographed images according to the data, the image acquisition method further comprises:

processing foreground and background except the actual target photography object to eliminate splicing distortion under different photography depths.

19. A manufacturing method of an image acquisition device, wherein the image acquisition device comprises:

a base substrate;

a plurality of image sensing member groups, disposed on a side of the base substrate, wherein each image sensing member group comprises a plurality of image sensing members; and each image sensing member comprises a photosensitive assembly with a plurality of photosensitive components, and a lens assembly covering a photosensitive side of the photosensitive assembly; and a plurality of shielding portions corresponding to the plurality of photosensitive components in a one-to-one correspondence, wherein the shielding portion is located between the photosensitive component and the lens assembly, and shield a part of an area of photosensitive surface of the photosensitive component; each image sensing member group corresponds to a photography depth, and the plurality of image sensing member groups correspond to a plurality of photography depths;

wherein, for the plurality of image sensing member groups, at least one of following is comprised:

arrangement modes of the image sensing members in the plurality of image sensing member groups are different; or camera intrinsic parameters of the image sensing members in the plurality of image sensing member groups are different;

wherein an area of the photosensitive component not being shielded by the shielding portion is a photosensitive area; and in a same image sensing member group, as for photosensitive components of corresponding positions of the different image sensing members, an area spliced by photosensitive areas of the photosensitive components is same as an area occupied by the photosensitive component;

wherein the manufacturing method comprises:

forming the plurality of photosensitive components;

forming shielding portions on photosensitive sides of the photosensitive components, so as to make the shielding portions shield a part of photosensitive surfaces of the photosensitive components;

transferring the photosensitive assembly with the shielding portions formed to the base substrate; and arranging a lens assembly on the photosensitive side of each photosensitive assembly.

20. The manufacturing method according to claim 19, wherein the forming shielding portions on photosensitive sides of the photosensitive components comprises:

depositing a shielding film layer on the photosensitive sides of the photosensitive components; and patterning the shielding film layer; or the forming shielding portions on photosensitive sides of the photosensitive components comprises:

forming the shielding portions on the photosensitive sides of the photosensitive components through a metal lift-off technology.

* * * * *